US009856172B2

(12) United States Patent
Kuzmin et al.

(10) Patent No.: US 9,856,172 B2
(45) Date of Patent: Jan. 2, 2018

(54) CONCRETE FORMULATION AND METHODS OF MAKING

(71) Applicant: LIGHT POLYMERS HOLDING, George Town (KY)

(72) Inventors: Valeriy Kuzmin, San Bruno, CA (US); Easton Groves, Grass Valley, CA (US); Gagandeep Sidhu, Fremont, CA (US); Michael Joseph Katila, Redwood City, CA (US)

(73) Assignee: LIGHT POLYMERS HOLDING, George Town (KY)

( * ) Notice: Subject to any disclaimer, the term of this patent is extended or adjusted under 35 U.S.C. 154(b) by 0 days.

(21) Appl. No.: 15/245,455

(22) Filed: Aug. 24, 2016

(65) Prior Publication Data

US 2017/0057870 A1   Mar. 2, 2017

Related U.S. Application Data

(60) Provisional application No. 62/209,544, filed on Aug. 25, 2015.

(51) Int. Cl.
| | | |
|---|---|---|
| *C04B 24/16* | (2006.01) | |
| *C04B 24/28* | (2006.01) | |
| *C04B 28/04* | (2006.01) | |
| *C08G 69/32* | (2006.01) | |
| *C04B 111/00* | (2006.01) | |

(52) U.S. Cl.
CPC .......... *C04B 24/287* (2013.01); *C04B 24/166* (2013.01); *C04B 28/04* (2013.01); *C08G 69/32* (2013.01); *C04B 2111/00181* (2013.01); *C04B 2111/00482* (2013.01)

(58) Field of Classification Search
CPC ....... C04B 24/287; C04B 28/04; C04B 14/06; C08G 69/42
USPC .......................................................... 524/3
See application file for complete search history.

(56) References Cited

U.S. PATENT DOCUMENTS

| | | | |
|---|---|---|---|
| 3,208,814 A | 9/1965 | Sievenpiper et al. | |
| 4,278,578 A | 7/1981 | Carpenter | |
| 4,605,698 A | 8/1986 | Briden | |
| 5,067,797 A | 11/1991 | Yokokura et al. | |
| 5,739,296 A | 4/1998 | Gvon et al. | |
| 5,863,113 A | 1/1999 | Oe et al. | |
| 6,002,829 A | 12/1999 | Winston et al. | |
| 6,045,894 A | 4/2000 | Jonza et al. | |
| 6,049,428 A | 4/2000 | Khan et al. | |
| 6,144,424 A | 11/2000 | Okuda et al. | |
| 6,174,394 B1 | 1/2001 | Gvon et al. | |
| 6,322,236 B1 | 11/2001 | Campbell et al. | |
| 6,399,166 B1 | 6/2002 | Khan et al. | |
| 6,481,864 B2 | 11/2002 | Hosseini et al. | |
| 6,563,640 B1 | 5/2003 | Ignatov et al. | |
| 6,583,284 B1 | 6/2003 | Sidorenko et al. | |
| 6,619,553 B1 | 9/2003 | Bobrov et al. | |
| 6,734,936 B1 | 5/2004 | Schadt et al. | |
| 6,841,320 B2 | 1/2005 | Lazarev et al. | |
| 6,846,522 B1 | 1/2005 | Bobrov et al. | |
| 6,847,420 B2 | 1/2005 | Lazarev et al. | |
| 6,848,897 B2 | 2/2005 | Lazarev et al. | |
| 6,876,806 B2 | 4/2005 | Lazarev et al. | |
| 6,913,783 B2 | 7/2005 | Lazarev et al. | |
| 6,942,925 B1 | 9/2005 | Lazarev et al. | |
| 6,962,734 B2 | 11/2005 | Nazarov et al. | |
| 7,015,990 B2 | 3/2006 | Yeh et al. | |
| 7,025,900 B2 | 4/2006 | Sidorenko et al. | |
| 7,026,019 B2 | 4/2006 | Dutova et al. | |
| 7,031,053 B2 | 4/2006 | Bobrov et al. | |
| 7,042,612 B2 | 5/2006 | Lazarev et al. | |
| 7,045,177 B2 | 5/2006 | Dutova et al. | |
| 7,053,970 B2 | 5/2006 | Lazarev | |
| 7,084,939 B2 | 8/2006 | Paukshto et al. | |
| 7,092,163 B2 | 8/2006 | Bastawros et al. | |
| 7,106,398 B2 | 9/2006 | Bobrov | |
| 7,108,749 B2 | 9/2006 | Bobrov | |
| 7,110,177 B2 | 9/2006 | Sugino et al. | |
| 7,113,337 B2 | 9/2006 | Lazarev et al. | |
| 7,132,138 B2 | 11/2006 | Lazarev | |
| 7,144,608 B2 | 12/2006 | Paukshto et al. | |
| 7,160,485 B2 | 1/2007 | Nazarov et al. | |
| 7,166,161 B2 | 1/2007 | Lazarev et al. | |
| 7,190,416 B2 | 3/2007 | Paukshto et al. | |
| 7,204,938 B2 | 4/2007 | Lazarev | |
| 7,211,824 B2 | 5/2007 | Lazarev | |
| 7,267,849 B2 | 9/2007 | Lazarev et al. | |
| 7,271,863 B2 | 9/2007 | Paukshto et al. | |

(Continued)

FOREIGN PATENT DOCUMENTS

| | | |
|---|---|---|
| EP | 0489951 | 6/1992 |
| JP | 06235917 | 8/1994 |

(Continued)

OTHER PUBLICATIONS

Gribkova "Chemical synthesis of polyaniline in the presence of poly(amidosulfonic acids) with different rigidity of the polymer chain," Apr. 2011, *Polymer* 52(12):2474-2484.
Konoshchuk, "Physicochemical Properties of Chemically and Mechanochemically Prepared Interpolymer Complexes of Poly(3,4-Ethylenedioxythiophene) with Polyamidosulfonate Dopants," Jan. 2014, *Theoretical and Experimental Chemistry* 50(1): 21-28 (Russian Original, Jan. 2014).
Koo et al., "Preparation and humidity-sensitive properties of novel photocurable sulfonated polyimides,"*Macromolecular Research*, Dec. 1, 2012, 20(12):1226-1233.
Kasianova, "New Transparent Birefringent Material for Interference Polarizer Fabrication" 2006 *XV International Symposium Advanced Display Technologies (ADT'06)*, Moscow, Russia, 1-6.
Li, "Design Optimization of Reflective Polarizers for LCD Backlight Recycling" Aug. 2009 *J Display Tech.*, 56(8): 335-340.

*Primary Examiner* — Hui Chin
(74) *Attorney, Agent, or Firm* — Mueting, Raasch & Gebhardt, PA (57) ABSTRACT

Compositions including cement and an additive and methods for making compositions and/or concrete mixtures including a cement and an additive are provided.

20 Claims, 5 Drawing Sheets

(56) References Cited

U.S. PATENT DOCUMENTS

| | | |
|---|---|---|
| 7,291,223 B2 | 11/2007 | Lazarev |
| 7,297,209 B2 | 11/2007 | Lazarev et al. |
| 7,315,338 B2 | 1/2008 | Yeh et al. |
| 7,317,499 B2 | 1/2008 | Paukshto et al. |
| 7,324,181 B2 | 1/2008 | Lazarev et al. |
| 7,405,787 B2 | 7/2008 | Paukshto et al. |
| 7,450,194 B2 | 11/2008 | Lazarev |
| 7,456,915 B2 | 11/2008 | Lazarev et al. |
| 7,479,311 B2 | 1/2009 | Bobrov |
| 7,480,021 B2 | 1/2009 | Rao et al. |
| 7,554,636 B2 | 6/2009 | Nakatsugawa |
| 7,557,876 B2 | 7/2009 | Lazarev et al. |
| 7,651,738 B2 | 1/2010 | Grodsky et al. |
| 7,660,047 B1 | 2/2010 | Travis et al. |
| 7,733,443 B2 | 6/2010 | Lazarev et al. |
| 7,850,868 B2 | 12/2010 | Matsuda et al. |
| 7,888,505 B2 | 2/2011 | Doutova et al. |
| 7,889,297 B2 | 2/2011 | Palto |
| 7,911,557 B2 | 3/2011 | Lazarev et al. |
| 7,969,531 B1 | 6/2011 | Li et al. |
| 8,081,270 B2 | 12/2011 | Lazarev |
| 8,142,863 B2 | 3/2012 | Palto |
| 8,168,082 B2 | 5/2012 | Matsuda et al. |
| 8,189,165 B2 | 5/2012 | Umemoto et al. |
| 8,257,802 B2 | 9/2012 | Inoue et al. |
| 8,268,937 B2 | 9/2012 | Bos et al. |
| 8,305,350 B2 | 11/2012 | Chang |
| 8,404,066 B2 | 3/2013 | Goto et al. |
| 8,416,376 B2 | 4/2013 | Palto |
| 8,512,824 B2 * | 8/2013 | Kasianova ......... C09K 19/3804 252/299.5 |
| 8,551,357 B2 | 10/2013 | Miyazaki et al. |
| 2003/0179363 A1 | 9/2003 | Wang |
| 2007/0064417 A1 | 3/2007 | Hatanaka et al. |
| 2007/0110378 A1 | 5/2007 | Zarian |
| 2007/0279934 A1 | 12/2007 | Kim et al. |
| 2007/0285599 A1 | 12/2007 | Oxude |
| 2008/0042154 A1 | 2/2008 | Wano |
| 2008/0074595 A1 | 3/2008 | Nakatsugawa |
| 2008/0298067 A1 | 12/2008 | Chu |
| 2008/0304283 A1 | 12/2008 | Parker et al. |
| 2009/0269591 A1 | 10/2009 | Kasianova et al. |
| 2010/0039705 A1 | 2/2010 | Doutova et al. |
| 2010/0085521 A1 | 4/2010 | Kasianova et al. |
| 2010/0149471 A1 | 6/2010 | Palto |
| 2010/0190015 A1 | 7/2010 | Kasianova |
| 2010/0215954 A1 | 8/2010 | Kuzmin et al. |
| 2011/0149206 A1 | 6/2011 | Lazarev |
| 2011/0149393 A1 | 6/2011 | Nokel et al. |
| 2011/0182084 A1 | 7/2011 | Tomlinson |
| 2011/0255305 A1 | 10/2011 | Chen et al. |
| 2012/0013982 A1 | 1/2012 | Kharatiyan |
| 2012/0081784 A1 | 4/2012 | Lazarev |
| 2012/0099052 A1 | 4/2012 | Lazarev |
| 2012/0113380 A1 | 5/2012 | Geivandov et al. |
| 2012/0113678 A1 | 5/2012 | Cornelissen et al. |
| 2012/0113680 A1 | 5/2012 | Nakai et al. |
| 2012/0244330 A1 | 9/2012 | Sun |
| 2013/0003178 A1 | 1/2013 | Lazarev |
| 2013/0011642 A1 | 1/2013 | Sun |
| 2013/0070480 A1 | 3/2013 | Griffin et al. |
| 2013/0251947 A1 | 9/2013 | Lazarev |
| 2014/0133177 A1 | 5/2014 | Miller et al. |
| 2014/0140091 A1 | 5/2014 | Vasylyev |
| 2014/0186637 A1 | 7/2014 | Kasianova et al. |
| 2014/0320961 A1 | 10/2014 | Lazarev |
| 2014/0322452 A1 | 10/2014 | Kasyanova et al. |
| 2014/0350214 A1 | 11/2014 | Kharatiyan |
| 2015/0086799 A1 | 3/2015 | Kasyanova et al. |
| 2015/0123911 A1 | 5/2015 | Poliakov et al. |
| 2015/0266999 A1 | 9/2015 | Kuzmin et al. |

FOREIGN PATENT DOCUMENTS

| | | |
|---|---|---|
| JP | 2010-091984 A | 4/2010 |
| WO | WO 2010-064194 A1 | 6/2010 |
| WO | WO 2012-007923 A1 | 1/2012 |
| WO | WO 2013-119922 A1 | 8/2013 |
| WO | WO 2014/174381 | 10/2014 |

* cited by examiner

Figure 3A — Slump: 4.5 in

Figure 3B — Slump: 10.5 in

Figure 3C — Slump: 1.5 in

Figure 4A — Slump: 7 in

Figure 4B — Slump: 5.5 in

Figure 4C — Slump: 9.5 in

CONCRETE FORMULATION AND METHODS OF MAKING

BACKGROUND

Concrete is used to form buildings and infrastructure worldwide including, for example, houses, airports, bridges, highways, rail systems, etc. Concrete has different properties when newly mixed and when hardened depending on the proportioning and mixing of ingredients including cement, water, and aggregates. Additional components or additives may also be added to concrete to reduce the cost of concrete construction; to modify the properties of hardened concrete; to ensure the quality of concrete during mixing, transporting, placing, and curing; and to overcome certain emergencies during concrete operations.

SUMMARY

The present disclosure relates to a composition including a cement and an additive and methods of making a mixture that includes a cement and an additive. The additive may be used to modify the properties of the cement and/or mixture. In some embodiments, the mixture is a concrete mixture. For example, the additive may alter the viscosity of the mixture, the rate of curing, and/or the properties of hardened concrete (e.g., porosity, strength, water permeability). The additive may also affect, for example, the amount of water that it is necessary to add to a concrete mixture before it is formed and/or cured.

In some embodiments, the present disclosure relates to a method including combining a cement and an additive, wherein the additive includes a polymer chain segment including wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$. In some embodiments, the additive and the cement are combined to form a concrete mixture including less than 5 weight percent (wt-%) of the additive, less than 2 wt-% of the additive, between 0.1 wt-% and 5 wt-% of the additive, or between 0.1 wt-% and 1 wt-% of the additive.

In some embodiments, the additive includes wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$; and wherein n is an integer between 1 and 10,000.

In some embodiments, the additive includes wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$; and wherein p is an integer greater than 1 and q is an integer greater than 1.

In some embodiments, the additive further includes an accelerator.

In some embodiments, the present disclosure relates to a composition including a cement and an additive, wherein the additive includes a polymer chain segment including wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$.

In some embodiments, the additive includes wherein A is independently selected from SO₃H, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$; and wherein n is an integer between 1 and 10,000.

In some embodiments, the additive includes wherein A is independently selected from SO₃H, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$; and wherein p is an integer greater than 1 and q is an integer greater than 1.

In some embodiments, the additive is less than 5 wt-% of the composition, is less than 2 wt-% of the composition, is between 0.1 wt-% and 5 wt-% of the composition, or is between 0.1 wt-% and 1 wt-% of the composition.

In some embodiments, the composition is a concrete mixture.

BRIEF DESCRIPTION OF THE FIGURES

FIG. 3A-C shows representative pictures of the slump of mixtures having a water to cement ratio of 0.7 tested with the Slump Test Procedure.

FIG. 4A-C shows representative pictures of the slump of mixtures tested with the Slump Test Procedure.

FIG. 5A-B shows compressive strength in pounds per square inch (psi) of concrete mixtures without (control) or with 0.35 wt-% or 0.7 wt-% poly(2,2'-disulfo-4,4'-benzidine terephthalamide).

DETAILED DESCRIPTION

In the following detailed description, examples are provided and reference is made to the accompanying figures that form a part hereof by way of illustration of several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have," "having," "include," "including,", "comprise," "comprising," or the like are used in their open ended sense, and generally mean "including, but not limited to." It will be understood that "consisting essentially of," "consisting of," and the like are subsumed in "comprising," and the like. The term "consisting of" means including, and limited to, whatever follows the phrase "consisting of" That is, "consisting of" indicates that the listed elements are required or mandatory, and that no other elements may be present. The term "consisting essentially of" indicates that any elements listed after the phrase are included, and that other elements than those listed may be included provided that those elements do not interfere with or contribute to the activity or action specified in the disclosure for the listed elements.

As used herein, "concrete" is a composition prepared from components including filler material, water, and cement. The filler material may include any suitable material including, for example, sand, stone, gravel, etc.

The present disclosure describes a composition including a cement and an additive and methods for forming such compositions. The additive includes a polymer chain segment including:

wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, or $Sn^{2+}$. In some embodiments the segment is preferably cross-linked to additional segments through covalent bonds. The cement and additive may be included in a concrete mixture. In some embodiments, the additive is a polymer.

While the present disclosure is not so limited, an appreciation of various aspects of the disclosure will be gained through a discussion of the examples provided below.

A cement may include a non-hydraulic cement or a hydraulic cement. In some embodiments, the cement is a Portland cement, including, for example, Type I, Type II, Type III, Type IV, Type V, Type Ia, Type IIa, Type IIIa, Type II(MH), Type II(MH)a, white Portland cement, etc. The cement may be normal or quick hardening.

The additives of the present disclosure include a polymer chain segment including wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, or $Sn^{2+}$. In some embodiments the segment is preferably cross-linked to additional segments through covalent bonds. The cement and additive may be included in a concrete mixture. In some embodiments, the additive is a polymer.

In some embodiments, the additive includes a polymer that includes a segment including the following formula:

wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, or $Sn^{2+}$; and wherein n is an integer between 2 and 10,000. In some embodiments, n is at least 5.

In one embodiment, A can be $SO_3^-$ and/or $COO^-$, wherein 3 percent (%), 4%, 5%, 8%, 10%, 15%, 20%, 25%, 30%, 35%, 40%, 45%, 50%, 60%, 70%, 80%, 90%, 95%, or 100% of A is $SO_3^-$ and 97%, 96%, 95%, 92%, 90%, 85%, 80%, 75%, 70%, 65%, 60%, 55%, 50%, 40%, 30%, 20%, 10%, 5%, or 0% of A is $COO^-$.

In one embodiment, the polymer segment includes a segment including the following formula:

wherein n is an integer between 2 and 10,000. Examples of a synthesis of this molecule where n is at least 2, poly(2,2'-disulfo-4,4'-benzidine terephthalamide), are described in U.S. Pat. No. 8,512,824. In one embodiment, the number-average molecular weight is about 10,000 to about 150,000. In another embodiment, the number-average molecular weight is about 50,000 to about 150,000.

In an alternative embodiment, the polymer segment includes a segment including (2,2'-dicarboxy)-4,4'-benzidine terephthalamide) or poly((2,2'-dicarboxy)-4,4'-benzidine terephthalamide):

wherein n is an integer between 2 and 10,000. In one embodiment, the number-average molecular weight is about 50,000 to about 150,000.

In some embodiments, the additive includes a copolymer that includes a segment including the following general formula:

(X-1a)

and a segment including the following general formula:

(X-2a)

wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, or $Sn^{2+}$; and wherein at least one segment of formula (X-1a) and one segment of formula (X-2a) are connected by a covalent bond. The polymer segment may include a single segment of formula (X-1a) bonded to a single segment of formula (X-2a) or mixed segments of formula (X-1a) and formula (X-2a). In one embodiment, the ratio of segments of formula (X-1a) to segments of formula (X-2a) is about 73:27. In other embodiments, the ratio of segments can be 0:100, 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 99:1, 100:0 or any ratio in between, or a range of these ratios. In some embodiments, the number-average molecular weight can be between 2,000 and 50,000, between 2,000 and 10,000, or between 4,000 and 6,000, or the number-average molecular weight can be about 5000.

In some embodiments, the additive includes wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3+}$, $Fe^{3+}$, $Cr^{3+}$, $Mn^{2+}$, $Cu^{2+}$, $Zn^{2+}$, $Pb^{2+}$, or $Sn^{2+}$; p is an integer greater than or equal to 1; and q is an integer greater than or equal to 1.

In one embodiment, A can be $SO_3^-$ and/or $COO^-$, wherein 0%, 3%, 4%, 5%, 8%, 10%, 15%, 20%, 25%, 30%, 35%, 40%, 45%, 50%, 60%, 70%, 80%, 90%, 95%, or 100% of A is $SO_3^-$ and 100%, 97%, 96%, 95%, 92%, 90%, 85%, 80%, 75%, 70%, 65%, 60%, 55%, 50%, 40%, 30%, 20%, 10%, 5%, or 0% of A is $COO^-$.

For example, in one embodiment the polymer segment includes a segment including the following formula:

(X-1)

and a segment including the following formula:

(X-2)

wherein at least one segment of formula (X-1) and one segment of formula (X-2) are connected by a covalent bond. For example, the polymer segment can include a segment including the following formula:

wherein p is an integer greater than or equal to 1 and q is an integer greater than or equal to 1.

Examples of synthesis of a polymer including these segments, 2,2'-disulfo-4,4'-benzidine terephthalamide-isophthalamide copolymer, are described in U.S. Publication No. 2010/0190015. In one embodiment, the ratio of segments of formula (X-1) to segments of formula (X-2) is about 73:27. In other embodiments, the ratio of segments can be 0:100, 1:99, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 99:1, 100:0 or any ratio in between, or range of these ratios. In some embodiments, the number-average molecular weight can be between 2,000 and 50,000, between 2,000 and 10,000, or between 4,000 and 6,000, or the number-average molecular weight can be about 5000.

For example, in one embodiment the polymer segment includes a segment including the following formula:

(X-1b)

and a segment including the following formula:

(X-2b)

wherein at least one segment of formula (X-1b) and one segment of formula (X-2b) are connected by a covalent bond.

In many embodiments, the polymer has a number average molecular weight in a range of 3,000 to 30,000, in a range of 3,500 to 10,000, or in a range of 5,000 to 7,000, for example.

The additives of the present disclosure can be provided as water-based solutions. The additives can be added to a mixture at up to 5 wt-%, up to 4 wt-%, up to 3 wt-%, up to 2 wt-%, up to 1 wt-%, or up to 0.5 wt-%. In some embodiments, the additive and the cement are combined to form a mixture including between 0.1 wt-% and 5 wt-% of the additive, between 0.1 wt-% and 2 wt-% of the additive, between 0.1 wt-% and 1 wt-% of the additive, between 0.1 wt-% and 0.7 wt-% of the additive, or between 0.1 wt-% and 0.5 wt-% of the additive.

In some embodiments, a cement and an additive are mixed combined to form a concrete mixture.

The concrete mixture may be used for any purpose including, for example, as a construction material including, for example, as architectural and decorative concrete, as stucco, as pervious concrete, etc. The concrete may be used in 3D printing.

The additives of the present disclosure may be added to alter the properties of a concrete mixture including, for example, the properties of hardened concrete; the quality of concrete during mixing, transporting, placing, and/or curing; the amount of water required to be added to the concrete mixture; the rate of cement hardening, setting, and/or hydration; the stability of the concrete mixture; the viscosity of the concrete mixture; the entrainment of air in the concrete mixture, etc.

In some embodiments, a cement and an additive may be combined. In some embodiments, the cement and the additive form a concrete mixture. In some embodiments, the additive may be combined with water and the mixture containing water and additive may be mixed with cement. In some embodiments, the concrete mixture also includes chemical admixtures, reinforcement materials, and/or mineral admixtures.

In some embodiments, the chemical admixture can include an accelerator that increases the setting time, including, for example, calcium nitrate ($Ca(NO_3)_2$), calcium chloride ($CaCl_2$), sodium nitrate ($NaNO_3$), etc. In some embodiments, the chemical admixture can include an air-entraining admixture, a water-reducing admixture, a retarding admixture, and/or a plasticizer.

EXAMPLES

Objects and advantages of this disclosure are further illustrated by the following examples, but the particular materials and amounts thereof recited in these examples, as well as other conditions and details, should not be construed to unduly limit this disclosure.

The following equipment and material was used in the following representative Procedures and Examples unless otherwise indicated.

82-480 Steel Slump Cone (BonTool Co., Gibsonia, Pa.)

Cement Mixer (Kobalt, Lowe's Companies, Inc., Mooresville, N.C.)

Quikrete® Portland Cement, Type II/V (Product No. 1124, Quikrete, Atlanta, Ga.)

Quikrete® All-Purpose Sand (Quikcrete, Atlanta, Ga.)

Aggregate (Broadmoor Landscape Supply—⅜ inch Drain Rock)

All reagents, starting materials, and solvents used in the following examples were purchased from commercial suppliers (such as Sigma-Aldrich Chemical Company, St. Louis, Mo.) and were used without further purification unless otherwise indicated.

Mixing Procedure
1. Add 50.6 pounds (lbs) sand, cement, and, if using, aggregate, into Cement Mixer; mix the dry components for one minute.
2. Add water. If using additive in the mix, add the additive into the water and add the additive-water mixture to the mixer while the mixer is rotating.
3. Mix for 3 minutes, rest for 3 minutes, mix for another 2 minutes—mix is ready to be poured for slump test or other tests Slump Test Procedure
1. Place the Slump Testing Cone on a flat non-porous surface.
2. Fill the cone approximately one third full, pack with stamping rod 25 times, tap with rubber mallet on the outside 3 times.
3. Repeat step 2 until the slump cone is full.
4. With a trowel, scrape off the excess concrete on top making sure it is level with the top of the cone.
5. Clean excess concrete around base of the cone away.
6. Slowly and smoothly lift the cone.
7. Place the cone next to the slumped concrete, measure from the top of the cone to the highest point of the slumped concrete to the nearest quarter inch.

Synthesis of 2,2'-disulfo-4,4'-benzidine tereplthalamide-isoplithalamide copolymer sodium salt 10.0 grams (g) (0.029 mol) of 4,4'-diaminobiphenyl-2,2'-disulfonic acid was mixed with 3.1 g (0.029 mol) of sodium carbonate and 160 ml of water and stirred until the solid completely dissolved. Then 50 ml of toluene was added. Upon stirring the obtained solution, a solution of 4.3 g (0.021 mol) of terephthaloyl chloride and 1.6 g (0.008 mol) of isophthaloyl chloride and 0.7 g (0.005 mol) of benzoyl chloride in 30 ml of toluene were added followed by addition of 3.4 g (0.033 mol) of sodium carbonate in 50 ml of water. The resulting mixture thickened in about 30 minutes. It was heated to boiling and toluene distilled out. The resulting water solution was ultrafiltered using a PES membrane with MW cut-off 5K Dalton. Yield of the copolymer was 200 g of 7% water solution.

Gel permeation chromatography (GPC) analysis of the sample was performed with Hewlett Packard 1260 chromatograph with diode array detector ($\lambda$=230 nm), using Varian GPC software Cirrus 3.2 and TOSOH Bioscience TSKgel G5000 PW-$_{XL}$ column and 0.2 M phosphate buffer (pH=7) as the mobile phase. Poly(para-styrenesulfonic acid) sodium salt was used as GPC standard. The calculated number average molecular weight, Mn, weight average molecular weight, Mw, and polydispersity, PD, were found as $5.3 \times 10^4$, $1.6 \times 10^5$, and 3.0 respectively.

Synthesis of poly(2,2'-disulfo-4,4'-benzidine tereplthalamide) sodium salt 10.0 g (0.029 mol) of 4,4'-diaminobiphenyl-2,2'-disulfonic acid was mixed with 3.1 g (0.029 mol) of sodium carbonate and 700 ml of water and stirred till dissolution. While stirring, the obtained solution a solution of 6.5 g (0.032 mol) of terephthaloyl chloride in 700 ml of toluene was added followed by a solution of 6.1 g of sodium carbonate in 100 g of water. The stirring was continued for 3 hours. Then the emulsion was heated to boiling and toluene distilled out. The resulting water solution was ultrafiltered using PES membrane with MW cut-off 20K Dalton. Yield of the polymer was 180 g of 8% water solution.

Gel permeation chromatography (GPC) analysis of the sample was performed with a Hewlett Packard 1260 chromatograph with diode array detector ($\lambda$=230 nm), using Varian GPC software Cirrus 3.2 and TOSOH Bioscience TSKgel G5000 PW$_{XL}$ column and 0.2 M phosphate buffer (pH=7) as the mobile phase. Poly(para-styrenesulfonic acid) sodium salt was used as GPC standard. The calculated number average molecular weight, Mn, weight average molecular weight. Mw, and polydispersity, PD, were found as $1.1 \times 10^5$, $4.6 \times 10^5$, and 4.2 respectively.

Comparative Example 1

The components shown in Table 1 were mixed:

TABLE 1

Batch size: 1 ft³
Water to cement ratio: 0.7

| Component | Control Weight (lbs.) | Control with Aggregate Weight (lbs.) |
|---|---|---|
| Cement | 19.1 | 19.1 |
| Bagged Sand | 50.6 | 50.6 |
| Water | 13.32 | 13.32 |
| Aggregate | | 47.2 |

Figure 1:
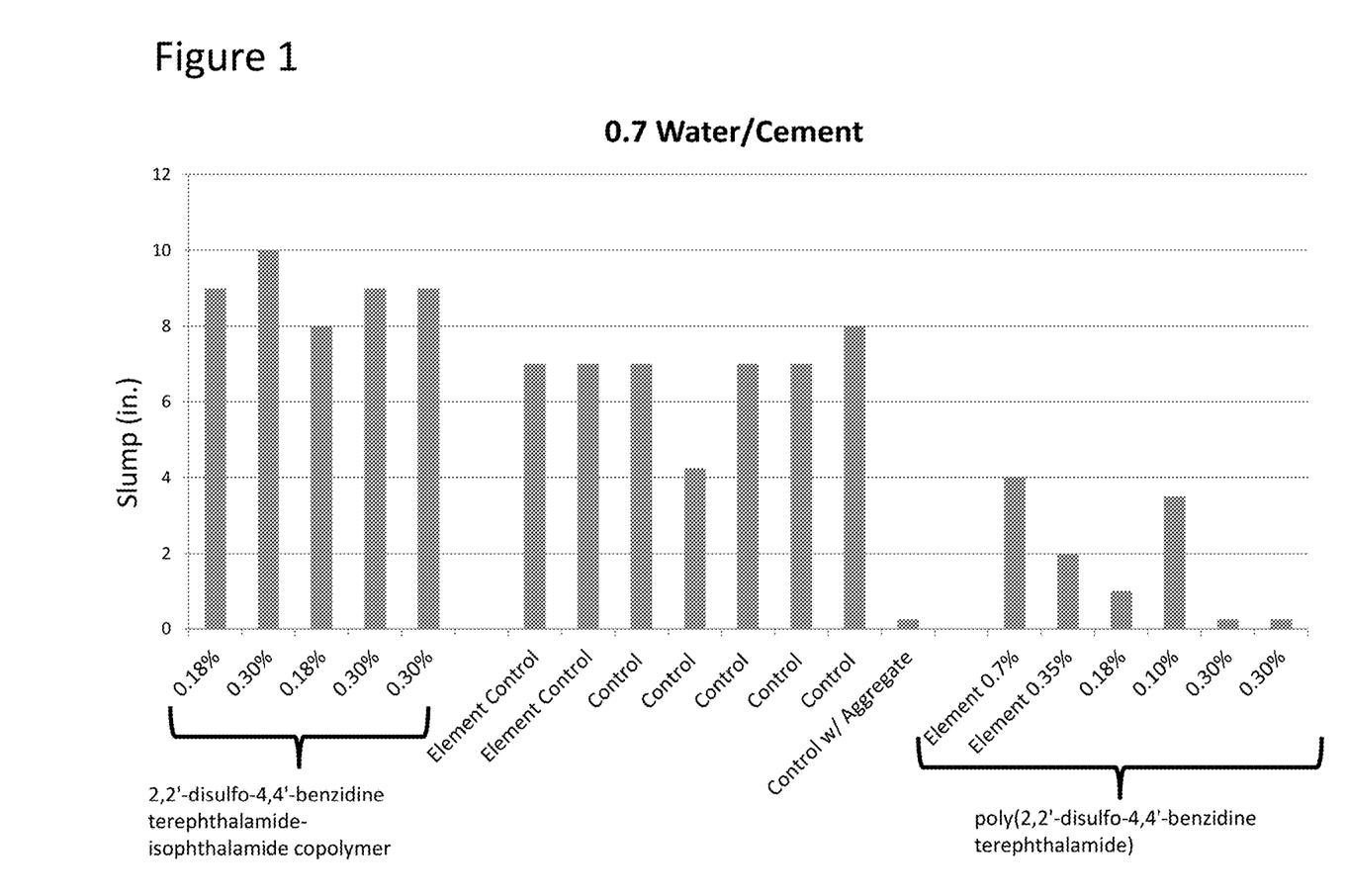
FIG. 1 shows the slump, measured in inches (in), of control mixtures, mixtures including the indicated wt-% of 2,2'-disulfo-4,4'-benzidine terephthalamide-isophthalamide copolymer, and mixtures including the indicated wt-% of poly(2,2'-disulfo-4,4'-benzidine terephthalamide) having a water to cement ratio of 0.7, tested with the Slump Test Procedure.
Figure 2:
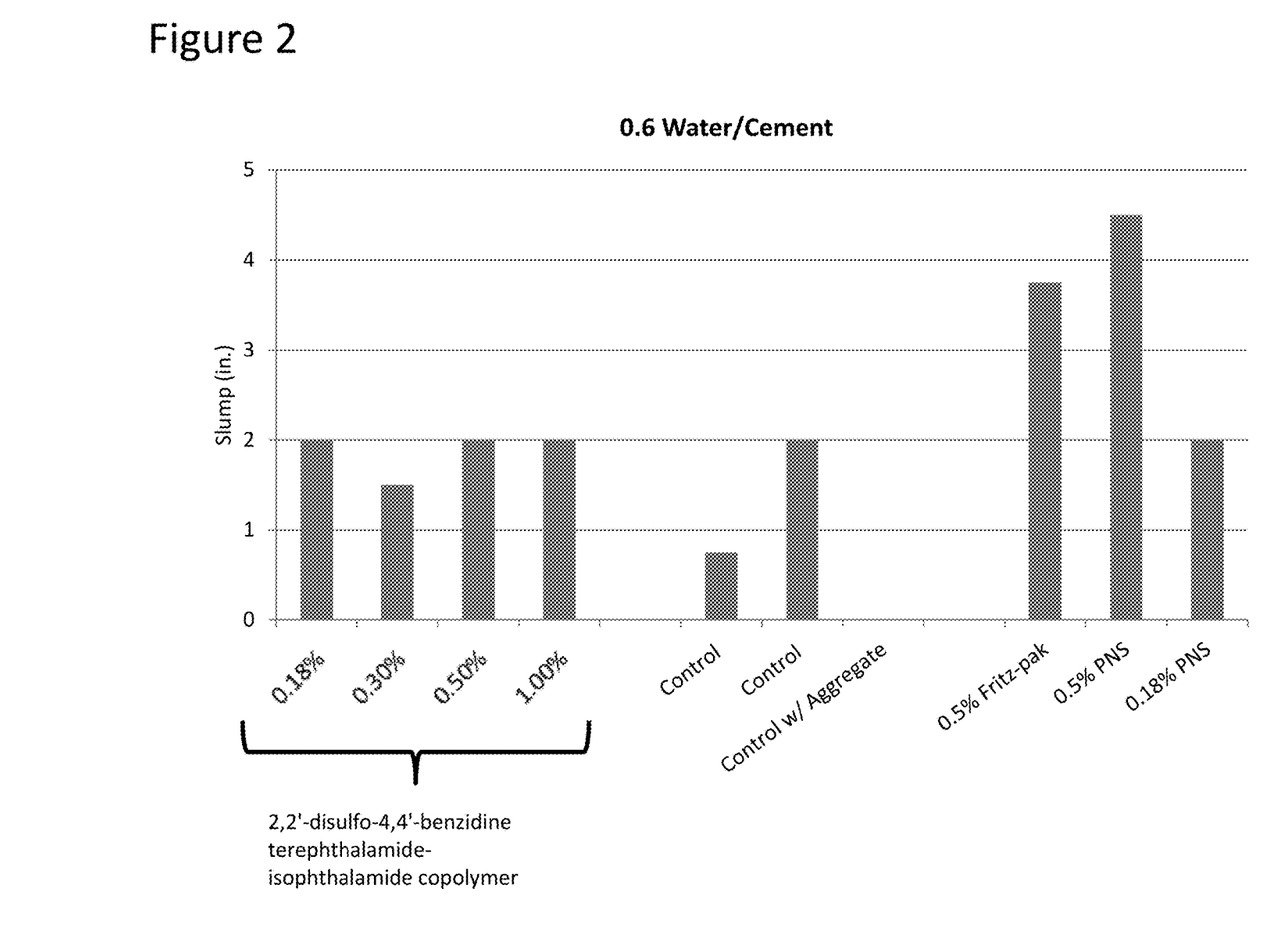
FIG. 2 shows the slump, measured in inches, of control mixtures, mixtures including the indicated wt-% of 2,2'-disulfo-4,4'-benzidine terephthalamide-isophthalamide copolymer, or mixtures including the indicated wt-% of commercially available water reducers (FR-1, Fritz-Pak Corporation, Mesquite, Tex., or sodium poly[(naphthalene-formaldehyde) sulfonate] (PNS), Gelest, Inc., Morrisville, Pa.) having a water to cement ratio of 0.6, tested with the Slump Test Procedure.
Figure 3A:
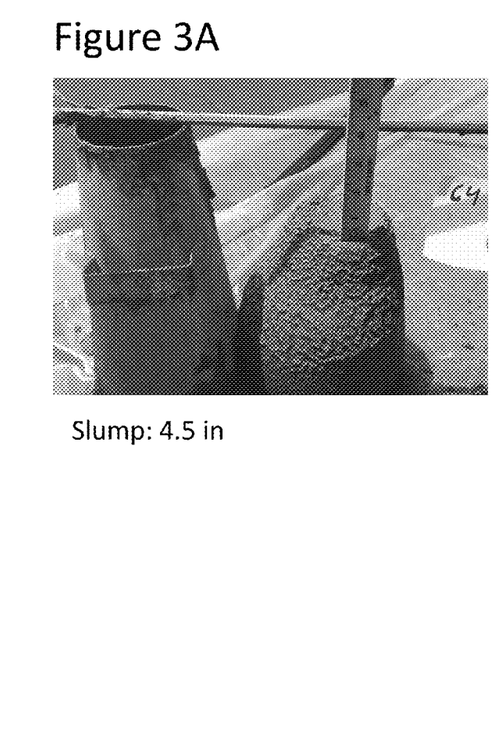
FIG. 3A shows the slump of mixture having a water to cement ratio of 0.7 containing no additives.

The resulting mixture was tested using the Slump Test Procedure. Results are shown in FIG. 1 (Control or Control w/Aggregate) and FIG. 2 (Control or Control w/Aggregate). FIG. 3A shows a representative figure of the Slump Test Procedure for the Control without aggregate.

Example 1

The components shown in Table 2 were mixed to form concrete that included 0.18 wt-% poly(2,2'-disulfo-4,4'-benzidine terephthalamide) and 0.3 wt-% poly(2,2"-disulfo-4,4'-benzidine terephthalamide):

TABLE 2

Batch size: 1 ft³
Water to cement ratio: 0.7

| Component | 0.18% poly(2,2'-disulfo-4,4'-benzidine terephthalamide) Weight (lbs.) | 0.3% poly(2,2'-disulfo-4,4'-benzidine terephthalamide Weight (lbs.) |
|---|---|---|
| Cement | 19.1 | 19.1 |
| Bagged Sand | 50.6 | 50.6 |
| Water | 13.32 | 13.32 |
| poly(2,2'-disulfo-4,4'-benzidine terephthalamide) | 0.03 | 0.06 |

Figure 3B:
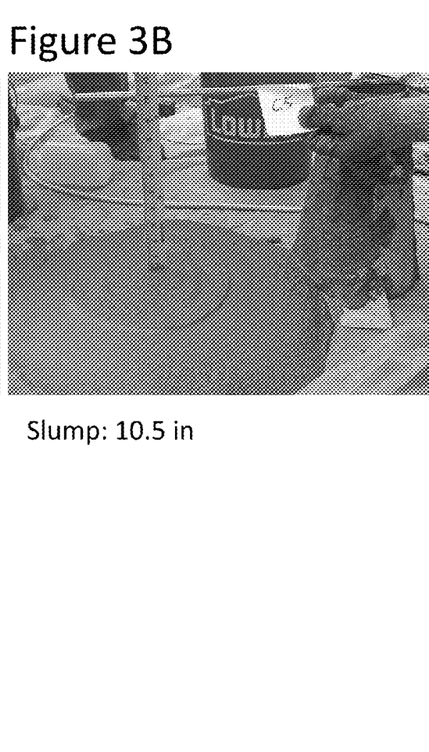
FIG. 3B shows the slump of mixture having a water to cement ratio of 0.7 containing 2,2'-disulfo-4,4'-benzidine terephthalamide-isophthalamide copolymer.
Figure 3C:
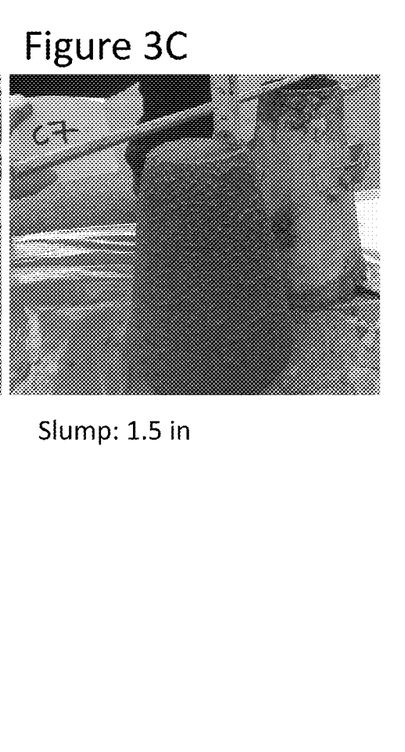
FIG. 3C shows the slump of mixture having a water to cement ratio of 0.7 containing poly(2,2'-disulfo-4,4'-benzidine terephthalamide).

The resulting mixtures were tested using the Slump Test Procedure. Results are shown in FIG. 1. FIG. 3C shows a representative figure of the Slump Test Procedure for the mixture including 0.3% poly(2,2'-disulfo-4,4'-benzidine terephthalamide).

Example 2

The components shown in Table 3 were mixed to form concrete mixtures including 0.1 wt-%, 0.18 wt-%, 0.3 wt-%, 0.35 wt-%, or 0.7 wt-% 2,2'-disulfo-4,4'-benzidine terephthalamide-isophthalamide:

TABLE 3

| | 0.1% 2,2'-disulfo-4,4'-benzidine terephthalamide-isophthalamide Weight (lbs.) | 0.18% 2,2'-disulfo-4,4'-benzidine terephthalamide-isophthalamide Weight (lbs.) | 0.3% 2,2'-disulfo-4,4'-benzidine terephthalamide-isophthalamide Weight (lbs.) | 0.35% 2,2'-disulfo-4,4'-benzidine terephthalamide-isophthalamide Weight (lbs.) | 0.7% 2,2'-disulfo-4,4'-benzidine terephthalamide-isophthalamide Weight (lbs.) |
|---|---|---|---|---|---|
| Component | | | | | |
| Cement | 19.1 | 19.1 | 19.1 | 19.1 | 19.1 |
| Bagged Sand | 50.6 | 50.6 | 50.6 | 50.6 | 50.6 |
| Water | 13.08 | 12.88 | 12.59 | 12.47 | 11.62 |
| 2,2'-disulfo-4,4'-benzidine terephthalamide-isophthalamide (7.3% solids) | 0.262 | 0.472 | 0.787 | 0.918 | 1.836 |

Batch size: 1 ft³
Water to cement ratio: 0.7

The resulting mixtures were tested using the Slump Test Procedure. Results are shown in FIG. 1.

Example 3

The components shown in Table 4 were mixed:

TABLE 4

| | 0.18% 2,2'-disulfo-4,4'-benzidine terephthalamide-isophthalamide copolymer Weight (lbs.) | 0.3% 2,2'-disulfo-4,4'-benzidine terephthalamide-isophthalamide copolymer Weight (lbs.) | 0.5% 2,2'-disulfo-4,4'-benzidine terephthalamide-isophthalamide copolymer Weight (lbs.) | 1.0% 2,2'-disulfo-4,4'-benzidine terephthalamide-isophthalamide copolymer Weight (lbs.) |
|---|---|---|---|---|
| Component | | | | |
| Cement | 19.1 | 19.1 | 19.1 | 19.1 |
| Bagged Sand | 50.6 | 50.6 | 50.6 | 50.6 |
| Water | 12.9 | 12.6 | 12.1 | 11.46 |
| 2,2'-disulfo-4,4'-benzidine terephthalamide-isophthalamide) (7.5% solids) | 0.460 | 0.766 | 1.277 | 2.553 |

Batch size: 1 ft³
Water to cement ratio: 0.6

The resulting mixture was tested using the Slump Test Procedure. Results are shown in FIG. 2. FIG. 3B shows a representative figure of the Slump Test Procedure for the mixture including 0.3% 2,2"-disulfo-4,4'-benzidine terephthalamide-isophthalamide copolymer Example 4

The components shown in Table 5 were mixed:

TABLE 5

| Component | Control (C37) Weight (lbs.) | Control (C38) Weight (lbs.) | C39 (0.3% 2,2'-disulfo-4,4'-benzidine terephthalamide-isophthalamide copolymer) Weight (lbs.) |
|---|---|---|---|
| Cement | 19.1 | 19.1 | 19.1 |
| Bagged Sand | 50.6 | 50.6 | 50.6 |
| 3/8" Aggregate | 47.2 | 47.2 | 47.2 |
| Water | 12.35 | 11.73 | 11.70 |
| 2,2'-disulfo-4,4'-benzidine terephthalamide-isophthalamide copolymer (7.8% solids) | — | — | 0.740 |

Figure 4A:
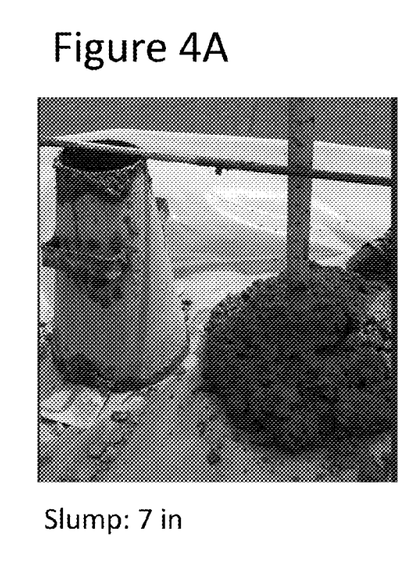
FIG. 4A has a water to cement ratio of 0.65.
Figure 4B:
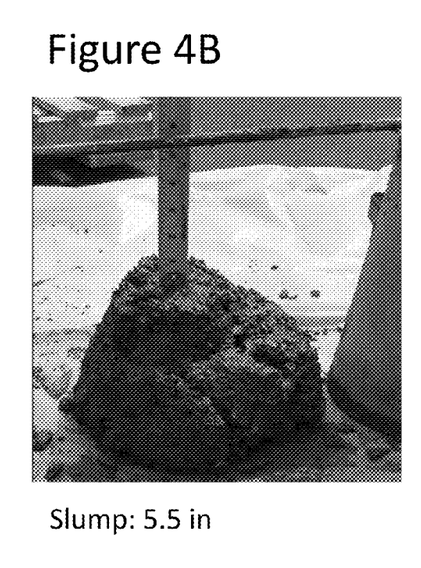
FIG. 4B has a water to cement ratio of 0.62.
Figure 4C:
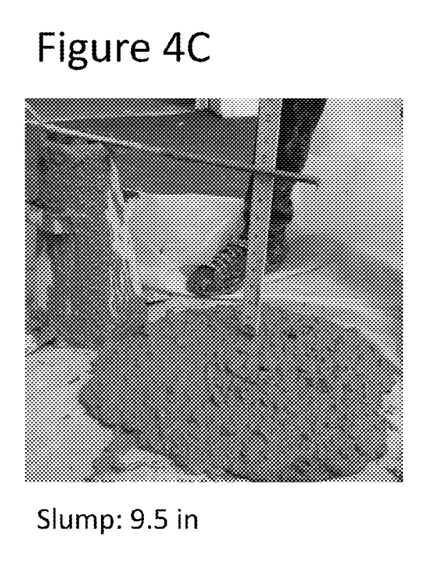
FIG. 4C has a water to cement ratio of 0.62 and contained 0.3 wt-% 2,2'-disulfo-4,4'-benzidine terephthalamide-isophthalamide copolymer.

The resulting mixture was tested using the Slump Test Procedure. Results are shown in Table 6 and FIG. 4A (Control (C37)), FIG. 4B (Control (C38)), and FIG. 4C (C39).

TABLE 6

|  | Water to Cement Ratio | Slump (inches) |
|---|---|---|
| Control (C37) | 0.65 | 7 |
| Control (C38) | 0.62 | 5.5 |
| C39 | 0.62 | 9.5 |

A water to cement ratio of 0.62 is equivalent to a 5% reduction in water compared to a water to cement ratio of 0.65. Compared to the control mixture having 0.65 and 0.62 water to cement ratio, the slump is higher with 2,2'-disulfo-4,4'-benzidine terephthalamide-isophthalamide copolymer added to the mixture.

Example 5

Laboratory testing work was performed by Element Materials Technology, St. Paul, Minn. ASTM test standards were used to determine slump (ASTM C143), air content (ASTM C231), unit weight (ASTM C138), time of set (ASTM C403), and compressive strength (ASTM C39)

Comparative test mixtures and procedures are outlined in ASTM C494 Sections 11-15.

The Following materials were used
Holcim Type I Portland Cement (ASTM C150)
Quikrete—All Purpose Sand (ASTM C33)
Aggregate Industries Inc.—No. 57 Limestone (ASTM C33)
Admixture including 21% poly(2,2'-disultb-4,4'-benzidine tereplithalamide) sodium salt Component amounts of each mixture are summarized in Tables 7 and 8. The mixture including 0.1% admixture (Mix Number 2) had a final concentration of 0.7 wt-% poly(2,2'-disulfo-4,4'-benzidine terephthalamide); the mixture including 0.05% admixture (Mix Number 4) had a final concentration of 0.35 wt-% poly(2,2'-disulfo-4,4'-benzidine terephthalamide).

TABLE 7

| Mix Design Number | 1 | 2 |
|---|---|---|
| Mixture Type | Control | Admixture |
| Portland Cement, lbs | 517 | 517 |
| Fine Aggregate, lbs | 1,365 | 1,365 |
| Coarse Aggregate, lbs | 1,700 | 1,700 |
| Water, lbs | 310[2] | 310[2] |
| Admixture: Light Polymers | — | 0.1% |

[2]Total water including water in admixture

TABLE 8

| Mix Design Number | 3 | 4 |
|---|---|---|
| Mixture Type | Control | Admixture |
| Portland Cement, lbs | 517 | 517 |
| Fine Aggregate, lbs | 1,365 | 1,365 |
| Coarse Aggregate, lbs | 1,700 | 1,700 |
| Water, lbs. | 310[2] | 310[2] |
| Admixture: Light Polymers | — | 0.05% |

[2]Total water including water in admixture

Figure 5A:
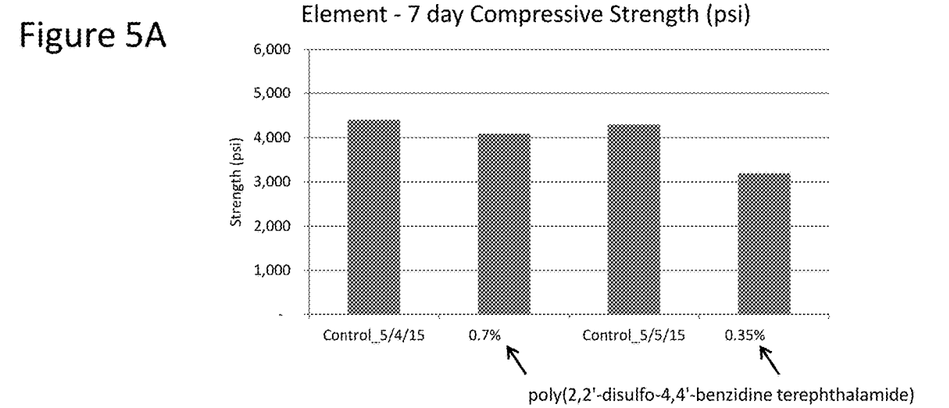
FIG. 5A shows the compressive strength 7 days after mixing.
Figure 5B:
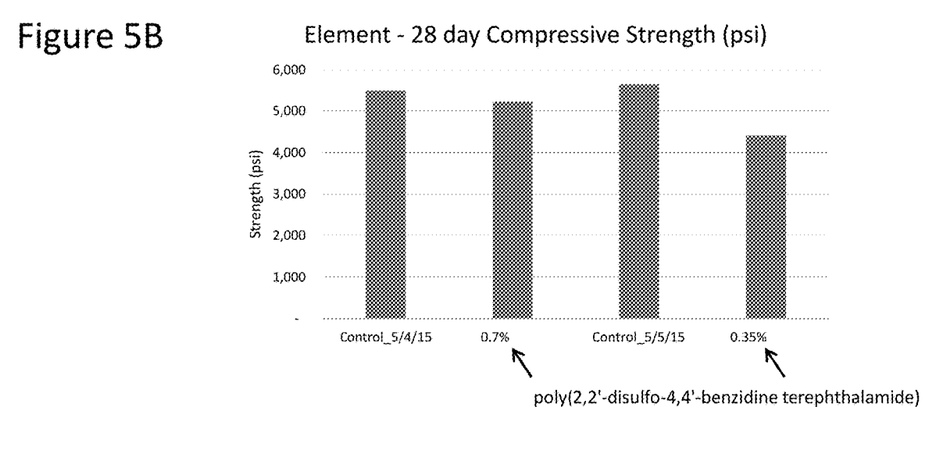
FIG. 5B shows the compressive strength 28 days after mixing.

Results are summarized in Table 9 and FIG. 5A and FIG. 5B, and additional results are shown in Tables 10-15.

TABLE 9

| Test | Control | 0.1% Admixture | Control | 0.05% Admixture |
|---|---|---|---|---|
| Slump, in, | 7 | 4.5 | 7 | 1.75 |
| Air Content, % | 2.2 | 2.1 | 1.9 | 2.2 |
| Unit Weight, lbs/ft$^3$ | 150.0 | 150.1 | 146.4 | 149.7 |
| Time of Initial Set, min | 309 | n/a | 293 | 365 |
| Time of Final Set, min | 436 | n/a | 419 | 491 |
| 7-Day Compressive Strength, psi | 4,440 | 4,090 | 4,290 | 3,190 |
| 28-Day Compressive Strength, psi | 5,500 | 5,230 | 5,630 | 4,410 |

TABLE 10

Plastic Concrete Test Data

| Mix Number: | 1 | 2 |
|---|---|---|
| Mixture Type: | Control | Admixture |
| Date: | May 4, 2015 | May 4, 2015 |
| Slump, in.: | 7 | 4½ |
| Air Content | 2.2% | 2.1% |
| Temperature, ° F.: | 65 | 65 |
| Unit Weight lbs/ft$^3$: | 150.0 | 150.1 |
| Time of initial Set, min | 365 | 1 |
| Time of Initial Set, min | 436 | 1 |

TABLE 11

7-Day Compressive Strength - ASTM C 39

| Sample Type: | Control | Control | Control |
|---|---|---|---|
| Mix Number: | 1 | 1 | 1 |
| Diameter, in.: | 4.00 | 4.00 | 4.00 |
| Height, in.: | 8.00 | 8.00 | 8.00 |
| Area, in$^2$: | 12.57 | 12.57 | 12.57 |
| Moist Cured, days: | 6 | 6 | 6 |
| Age of Sample at Test, days: | 7 | 7 | 7 |
| Load at Failure, lbf: | 54,600 | 56,440 | 54,820 |
| Compressive Strength, psi: | 4,340 | 4,490 | 4,360 |
| Sample Type: | Admixture | Admixture | Admixture |
| Mix Number: | 2 | 2 | 2 |
| Diameter, in.: | 4.00 | 4.00 | 4.00 |
| Height, in.: | 8.00 | 8.00 | 8.00 |
| Area, in$^2$: | 12.57 | 12.57 | 12.57 |
| Moist Cured, days: | 6 | 6 | 6 |
| Age of Sample at Test, days: | 7 | 7 | 7 |
| Load at Failure, lbf: | 49,240 | 53,370 | 51,820 |
| Compressive Strength, psi: | 3,920 | 4,240 | 4,120 |

TABLE 12

28-Day Compressive Strength - ASTM C 39

| Sample Type: | Control | Control | Control |
|---|---|---|---|
| Mix Number: | 1 | 1 | 1 |
| Diameter, in.: | 4.00 | 4.00 | 4.00 |
| Height, in.: | 8.00 | 8.00 | 8.00 |
| Area, in$^2$: | 12.57 | 12.57 | 12.57 |
| Moist Cured, days: | 27 | 27 | 27 |
| Age of Sample at Test, days: | 28 | 28 | 28 |
| Load at Failure, lbf: | 67,930 | 68,780 | 70,800 |
| Compressive Strength, psi: | 5,400 | 5,470 | 5,630 |
| Sample Type: | Admixture | Admixture | Admixture |
| Mix Number: | 2 | 2 | 2 |
| Diameter, in.: | 4.00 | 4.00 | 4.00 |
| Height, in.: | 8.00 | 8.00 | 8.00 |
| Area, in$^2$: | 12.57 | 12.57 | 12.57 |
| Moist Cured, days: | 27 | 27 | 27 |
| Age of Sample at Test, days: | 28 | 28 | 28 |
| Load at Failure, lbf: | 69,220 | 63,890 | 64,320 |
| Compressive Strength, psi: | 5,500 | 5,080 | 5,120 |

TABLE 13

Plastic Concrete Test Data

| Mix. Number: | 3 | 4 |
|---|---|---|
| Mixture Type: | Control | Admixture |
| Date: | May 5, 2015 | May 5, 2015 |
| Slump, in.: | 7 | 1¾ |
| Air Content: | 1.9% | 2.2% |
| Temperature, °F.: | 67 | 67 |
| Unit Weight, lbs/ft³: | 146.4 | 149.7 |
| Time of initial Set, min | 293 | 365 |
| Time of initial Set, min | 419 | 491 |

TABLE 14

7-Day Compressive Strength - ASTM C 39

| Sample Type: | Control | Control | Control |
|---|---|---|---|
| Mix Number: | 3 | 3 | 3 |
| Diameter, in: | 4.00 | 4.00 | 4.00 |
| Height, in.: | 8.00 | 8.00 | 8.00 |
| Area, in²:. | 12.57 | 12.57 | 12.57 |
| Moist Cured, days: | 6 | 6 | 6 |
| Age of Sample at Test, days: | 7 | 7 | 7 |
| Load at Failure, lbf: | 53,620 | 55,670 | 52,500 |
| Compressive Strength, psi: | 4,260 | 4,430 | 4,180 |
| Sample Type: | Admixture | Admixture | Admixture |
| Mix Number: | 4 | 4 | 4 |
| Diameter, in.: | 4.00 | 4.00 | 4.00 |
| Height, in.: | 8.00 | 8.00 | 8.00 |
| Area, in²: | 12.57 | 12.57 | 12.57 |
| Moist Cured, days: | 6 | 6 | 6 |
| Age of Sample at Test, days: | 7 | 7 | 7 |
| Load at Failure, lbf: | 42,000 | 38,640 | 39,720 |
| Compressive Strength, psi: | 3,340 | 3,070 | 3,160 |

TABLE 15

28-Day Compressive Strength - ASTM C 39

| Sample Type: | Control | Control | Control |
|---|---|---|---|
| Mix Number | 3 | 3 | 3 |
| Diameter, in.: | 4.00 | 4.00 | 4.00 |
| Height, in.: | 8.00 | 8.00 | 8.00 |
| Area, in²: | 12.57 | 12.57 | 12.57 |
| Moist Cured, days: | 27 | 27 | 27 |
| Age of Sample at Test, days: | 28 | 28 | 28 |
| Load at Failure, lbf: | 74,790 | 67,630 | 70,770 |
| Compressive Strength, psi: | 5,950 | 5,380 | 5,630 |
| Sample Type: | Admixture | Admixture | Admixture |
| Mix Number: | 4 | 4 | 4 |
| Diameter, in.: | 4.00 | 4.00 | 4.00 |
| Height, in.: | 8.00 | 8.00 | 8.00 |
| Area, in²: | 12.57 | 12.57 | 12.57 |
| Moist Cured, days: | 27 | 27 | 27 |
| Age of Sample at Test, days: | 28 | 28 | 28 |
| Load at Failure, lbf: | 56,190 | 54,430 | 55,690 |
| Compressive Strength, psi: | 4,470 | 4,330 | 4,430 |

Thus, embodiments of CONCRETE FORMULATION AND METHODS OF MAKING are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A method comprising combining a cement and an additive, wherein the additive comprises a polymer chain segment comprising wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$.

2. The method of claim 1, wherein the additive and the cement are combined to form a concrete mixture comprising less than 5 wt-% of the additive, based on a total weight of the concrete mixture.

3. The method of claim 1, wherein the additive and the cement are combined to form a concrete mixture comprising less than 2 wt-% of the additive, based on a total weight of the concrete mixture.

4. The method of claim 1, wherein the additive and the cement are combined to form a concrete mixture comprising between 0.1 wt-% and 5 wt-% of the additive, based on a total weight of the concrete mixture.

5. The method of claim 1, wherein the additive and the cement are combined to form a concrete mixture comprising between 0.1 wt-% and 1 wt-% of the additive, based on a total weight of the concrete mixture.

6. The method of claim 1, wherein the additive comprises wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$, and wherein n is an integer between 1 and 10,000.

7. The method of claim 1, wherein the additive consists essentially of wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$, and wherein n is an integer between 1 and 10,000.

8. The method of claim 1, wherein the additive comprises wherein A is independently selected from SO$_3$H, COOH, a sulfonic or carboxy salt of an alkali metal, ammonium, quaternary ammonium, an alkaline earth metal, Al$^{3+}$, La$^{3+}$, Ce$^{3-}$, Fe$^{3+}$, Cr$^{3+}$, Mn$^{2+}$, Cu$^{2+}$, Zn$^{2+}$, Pb$^{2+}$, or Sn$^{2+}$; and wherein p is an integer greater than 1 and q is an integer greater than 1.

9. The method of claim 1, wherein the additive consists essentially of wherein A is independently selected from SO$_3$H, COOH, a sulfonic or carboxy salt of an alkali metal, ammonium, quaternary ammonium, an alkaline earth metal, Al$^{3+}$, La$^{3+}$, Ce$^{3-}$, Fe$^{3+}$, Cr$^{3+}$, Mn$^{2+}$, Cu$^{2+}$, Zn$^{2+}$, Pb$^{2+}$, or Sn$^{2+}$; and wherein p is an integer greater than 1 and q is an integer greater than 1.

10. The method of claim 1, wherein the additive further comprises an accelerator.

11. A composition comprising a cement and an additive, wherein the additive comprises a polymer chain segment comprising wherein A is independently selected from SO$_3$H, COOH, a sulfonic or carboxy salt of an alkali metal, ammonium, quaternary ammonium, an alkaline earth metal, Al$^{3+}$, La$^{3+}$, Ce$^{3-}$, Fe$^{3+}$, Cr$^{3+}$, Mn$^{2+}$, Cu$^{2+}$, Zn$^{2+}$, Pb$^{2+}$, or Sn$^{2+}$.

12. The composition of claim 11, wherein the additive comprises wherein A is independently selected from SO$_3$H, COOH, a sulfonic or carboxy salt of an alkali metal, ammonium, quaternary ammonium, an alkaline earth metal, Al$^{3+}$, La$^{3+}$, Ce$^{3-}$, Fe$^{3+}$, Cr$^{3+}$, Mn$^{2+}$, Cu$^{2+}$, Zn$^{2+}$, Pb$^{2+}$, or Sn$^{2+}$; and wherein n is an integer between 1 and 10,000.

13. The composition of claim 11, wherein the additive consists essentially of wherein A is independently selected from SO$_3$H, COOH, a sulfonic or carboxy salt of an alkali metal, ammonium, quaternary ammonium, an alkaline earth metal, Al$^{3+}$, La$^{3+}$, Ce$^{3-}$, Fe$^{3+}$, Cr$^{3+}$, Mn$^{2+}$, Cu$^{2+}$, Zn$^{2+}$, Pb$^{2+}$, or Sn$^{2+}$; and wherein n is an integer between 1 and 10,000.

14. The composition of claim 11, wherein the additive comprises wherein A is independently selected from SO$_3$H, COOH, a sulfonic or carboxy salt of an alkali metal, ammonium, quaternary ammonium, an alkaline earth metal, Al$^{3+}$, La$^{3+}$, Ce$^{3-}$, Fe$^{3+}$, Cr$^{3+}$, Mn$^{2+}$, Cu$^{2+}$, Zn$^{2+}$, Pb$^{2+}$, or Sn$^{2+}$; and wherein p is an integer greater than 1 and q is an integer greater than 1.

15. The composition of claim 11, wherein the additive consists essentially of wherein A is independently selected from $SO_3H$, COOH, a sulfonic or carboxy salt of an alkali metal, ammonium, quaternary ammonium, an alkaline earth metal, $Al^{3+}$, $La^{3+}$, $Ce^{3-}$, $Fe^{3+}$, $Cr^{3+}$, $Mn^{2+}$, $Cu^{2+}$, $Zn^{2+}$, $Pb^{2+}$, or $Sn^{2+}$; and wherein p is an integer greater than 1 and q is an integer greater than 1.

16. The composition of claim 11, wherein the additive is less than 5 wt-% of the composition.

17. The composition of claim 11, wherein the additive is less than 2 wt-% of the composition.

18. The composition of claim 11, wherein the additive is between 0.1 wt-% and 5 wt-% of the composition.

19. The composition of claim 11, wherein the additive is between 0.1 wt-% and 1 wt-% of the composition.

20. The composition of claim 11, wherein the composition is a concrete mixture.

\* \* \* \* \*

UNITED STATES PATENT AND TRADEMARK OFFICE
CERTIFICATE OF CORRECTION

PATENT NO. : 9,856,172 B2
APPLICATION NO. : 15/245455
DATED : January 2, 2018
INVENTOR(S) : Valeriy Kuzmin et al.

It is certified that error appears in the above-identified patent and that said Letters Patent is hereby corrected as shown below:

In the Specification

Column 11, Line 26: "tereplithalamide-isoplithalamide" should be changed to --terephthalamide-isophthalamide--

Column 11, Line 54: "tereplthalamide" should be changed to --terephthalamide--

Column 15, Line 36: "tereplithalamide" should be changed to --terephthalamide--

In the Claims

Column 18, Line 20: "$Ce^{3-}$" should be changed to --$Ce^{3+}$--

Column 18, Line 50: "$Ce^{3-}$" should be changed to --$Ce^{3+}$--

Column 18, Line 66: "$Ce^{3-}$" should be changed to --$Ce^{3+}$--

Column 19, Line 24: "$Ce^{3-}$" should be changed to --$Ce^{3+}$--

Column 19, Line 50: "$Ce^{3-}$" should be changed to --$Ce^{3+}$--

Column 20, Line 4: "$Ce^{3-}$" should be changed to --$Ce^{3+}$--

Column 20, Line 20: "$Ce^{3-}$" should be changed to --$Ce^{3+}$--

Column 20, Line 37: "$Ce^{3-}$" should be changed to --$Ce^{3+}$--

Column 20, Line 63: "$Ce^{3-}$" should be changed to --$Ce^{3+}$--

Column 22, Line 4: "$Ce^{3-}$" should be changed to --$Ce^{3+}$--

Signed and Sealed this
Tenth Day of April, 2018

Andrei Iancu
*Director of the United States Patent and Trademark Office*